United States Patent
Wallen et al.

(10) Patent No.: US 9,238,729 B2
(45) Date of Patent: Jan. 19, 2016

(54) FUNCTIONALIZED SILICA WITH ELASTOMER BINDER

(71) Applicant: Cooper Tire & Rubber Company, Findlay, OH (US)

(72) Inventors: Peter John Wallen, Findlay, OH (US); Howard Colvin, Wayne, OH (US)

(73) Assignee: COOPER TIRE & RUBBER COMPANY, Findlay, OH (US)

( * ) Notice: Subject to any disclaimer, the term of this patent is extended or adjusted under 35 U.S.C. 154(b) by 0 days.

(21) Appl. No.: 14/456,613

(22) Filed: Aug. 11, 2014

(65) Prior Publication Data

US 2014/0350159 A1 Nov. 27, 2014

Related U.S. Application Data

(63) Continuation-in-part of application No. 14/177,467, filed on Feb. 11, 2014, now Pat. No. 9,133,325.

(60) Provisional application No. 61/763,676, filed on Feb. 12, 2013.

(51) Int. Cl.
| | |
|---|---|
| *C08L 21/00* | (2006.01) |
| *C08K 9/06* | (2006.01) |
| *B32B 27/14* | (2006.01) |
| *C08L 9/06* | (2006.01) |
| *B32B 25/04* | (2006.01) |
| *B60C 1/00* | (2006.01) |
| *C08K 9/08* | (2006.01) |

(52) U.S. Cl.
CPC .............. *C08K 9/06* (2013.01); *B32B 25/042* (2013.01); *B32B 25/047* (2013.01); *B32B 27/14* (2013.01); *B60C 1/00* (2013.01); *B60C 1/0016* (2013.04); *B60C 1/0025* (2013.04); *C08K 9/08* (2013.01); *C08L 9/06* (2013.01); *C08L 21/00* (2013.01); *B60C 2001/0066* (2013.04); *C08K 2201/006* (2013.01); *Y10T 428/2995* (2015.01)

(58) Field of Classification Search
USPC .......... 428/403, 405, 407; 523/200, 205, 209, 523/352
See application file for complete search history.

(56) References Cited

U.S. PATENT DOCUMENTS

| | | | |
|---|---|---|---|
| 3,227,675 A | 1/1966 | Papalos et al. | |
| 3,768,537 A | 10/1973 | Hess et al. | |
| 4,076,550 A | 2/1978 | Thurn et al. | |
| 4,151,154 A | 4/1979 | Berger | |
| 5,017,630 A | 5/1991 | Raines et al. | |
| 5,166,227 A * | 11/1992 | Raines et al. | 523/342 |
| 5,763,388 A | 6/1998 | Lightsey et al. | |
| 6,407,153 B1 | 6/2002 | von Hellens | |
| 7,628,971 B2 | 12/2009 | Stenzel et al. | |
| 8,357,733 B2 | 1/2013 | Wallen et al. | |
| 2006/0281009 A1* | 12/2006 | Boyer et al. | 429/247 |
| 2007/0260005 A1* | 11/2007 | Karato et al. | 524/458 |

FOREIGN PATENT DOCUMENTS

JP  2008-105919  * 5/2008

OTHER PUBLICATIONS

Machine-generated translation of JP 2008-105919 (no date).*
Product data sheet for Zeosyl200.*
"Adsorption of Charged Diblock Copolymers on Porous Silica" authored by Pefferkorn et al. and published in the Journal of Polymer Science: Polymer Chemistry Edition (1981) 19, 27-34.*
"One Pot Preparation of Conducting Polymer-Coated Silica Particles: Model Highly Absorbing Aerosols" authored by Lovett et al. and published in Advanced Functional Materials (2014) 24, 1290-1299.*
"A Novel Approach to Prepare PBT Nanocomposites with Elastomer-Modified SiO2 Particles" authored by Zhang et al. and published in Polymer Composites (2009) 673-679.*
G. Heinrich, "Why Silica Technology needs SSBR in high performance tires," KGK, Jul. 2008, p. 368.
http://larox.smartpage.fi/en/hoesch/pdf/Larox_Hoesch.pdf.
http://www.menardifilters.com/pdf/liquid_brochure.pdf.

* cited by examiner

*Primary Examiner* — Marc Zimmer
(74) *Attorney, Agent, or Firm* — Fraser Clemens Martin & Miller LLC; Jacob M. Ward

(57) ABSTRACT

A functionalized silica product includes particles of a hydrophobated silica having a coating of a polymer. A ratio of the hydrophobated silica to the polymer is from about 0.3/1 to about 100/1. The functionalized silica product may be in the form of a friable crumb or a powder, or in the form of a bale, that may be mixed into an elastomer formulation for a rubber article, such as a tire component.

8 Claims, 4 Drawing Sheets

FUNCTIONALIZED SILICA WITH ELASTOMER BINDER

CROSS-REFERENCE TO RELATED APPLICATIONS

This application is a continuation-in-part of U.S. application Ser. No. 14/177,467, filed on Feb. 11, 2014, which in turn claims the benefit of U.S. Provisional Application No. 61/763,676, filed on Feb. 12, 2013. The entire disclosures of the above applications are hereby incorporated herein by reference.

FIELD OF THE INVENTION

The present disclosure relates to reinforcing fillers for rubber compounds and, more particularly, to a functionalized silica filler for rubber compounds.

BACKGROUND OF THE INVENTION

Rubber is often compounded with silica to provide desired compound properties for tires and other rubber products. The incorporation of the silica into the rubber using a dry mixing process, where a coupling agent is attached to the silica surface during the mixing process to allow it to blend into the rubber, is well known. When the silica is coated with the coupling agent, the silica is referred to as "hydrophobated" or "functionalized". A silane is often used as the coupling agent for the silica to be incorporated into the rubber.

The reaction of the silica with the silane coupling agent during the dry mixing process undesirably results in a generation of ethanol, which must then be removed during processing. Manufacturing processes for dry mixing simultaneously disperse and distribute silica into the rubber matrix, while removing the ethanol. These processes have been effective but are time-consuming, energy-intensive, and require great amounts of operating and maintenance expenses.

It is also well known to pretreat silica with the coupling agent, prior to incorporating the silica into the rubber compound, as an alternative to the dry mixing process. There are advantages to using a pretreated silica, including low or no alcohol emissions from the silane during mixing, and the elimination of the reaction step during mixing, which is otherwise required when dry mixing. The pretreating of silica is described in various patents including U.S. Pat. No. 3,227,675 to Papalos, U.S. Pat. No. 4,076,550 to Thurn et al., and U.S. Pat. No. 4,151,154 to Berger.

Silica fillers do not disperse easily in rubber using conventional mixing. Especially with high surface area silica, mixing sufficient to provide optimal physical properties has proven difficult due to the inability to disperse the high surface area silica. Achieving good dispersion with high surface area silica using conventional rubber mixing has proven highly problematic or impossible. Thus, the full potential of high surface area silica has not been realized in the tire industry.

High surface area silica is defined herein as silica having a BET specific surface area greater than about 200 $m^2/g$. In a most particular example, the high surface area silica has a BET specific surface area greater than about 220 $m^2/g$. Although pretreated silica is hydrophobated, the pretreated silica typically does not disperse into the rubber as well as other conventional fillers, such as carbon black.

A further alternative to both dry mixing and pretreating silica is the incorporation of silica in a rubber masterbatch in a concentrated amount. The silica-rubber masterbatch, normally provided in a bale, can then be conventionally mixed with the rubber to disperse the silica to a desired loading in the rubber compound. It should be appreciated that there are advantages to mixing of hydrophobated silica in a rubber latex prior to forming the rubber masterbatch, compared to mixing of silica directly into rubber compounds. The silica-rubber masterbatch is typically a combination of silica and polymer and, optionally, other compounding ingredients such as process oil and inert materials. Known silica-rubber masterbatches are described in U.S. Pat. No. 8,357,733 to Wallen et al. and U.S. Pat. No. 5,763,388 to Lightsey et al.

Due to minimal manufacturing complexity, silica-rubber masterbatches most often use an emulsion polymer such as emulsion styrene-butadiene rubber (ESBR) as the masterbatch rubber. However, many rubber compounds, and especially tire rubber compounds, require the use of solution polymers such as solution styrene-butadiene rubber (SSBR) instead of emulsion polymers, for reasons of performance. The use of emulsion polymer-based silica-rubber masterbaches in solution polymer-based rubber compounds can detrimentally affect rubber compound performance, and is therefore undesirable. The use of silica-rubber masterbatches having other types of non-solution polymers such as natural rubber is also undesirable.

There is a continuing need for a functionalized silica and polymer composite that can be incorporated into a rubber system with excellent dispersion and minimal dust release. Desirably, the functionalized silica and polymer composite may be incorporated into a predominantly SSBR rubber formulation without significantly affecting overall performance in an end product.

SUMMARY OF THE INVENTION

In concordance with the instant disclosure, a functionalized silica and polymer composite that can be incorporated into a rubber system with excellent dispersion and minimal dust release, and which may be incorporated into a predominantly SSBR rubber formulation without significantly affecting overall performance in an end product, is surprisingly discovered.

It is an objective of the present disclosure to facilitate a distribution of silica in a rubber compound, for example, a rubber compound used in the production of tire components. The present disclosure also militates against certain performance disadvantages associated with ESBR masterbatch technology, when used in SSBR formulations.

In one embodiment, a functionalized silica product includes particles of a hydrophobated silica having a coating of a polymer. A ratio of the hydrophobated silica to the polymer is from about 0.3/1 to about 100/1. The hydrophobated silica includes a high surface area silica having a BET specific surface area greater than about 200 $m^2/g$.

In a further embodiment, a rubber formulation includes a quantity of elastomer and a quantity of particles of the hydrophobated silica having the coating of polymer, i.e., the functionalized silica product. The particles are substantially evenly distributed throughout the elastomer.

In another embodiment, a method for manufacturing a functionalized silica product includes a step of providing a hydrophobated high surface area silica in a rotary dryer. A polymer cement is then introduced to the rotary dryer. The polymer cement has a solution polymer at least partially dissolved in a solvent. The rotary dryer is then heated to drive off the solvent, wherein the functionalized silica product is formed.

DRAWINGS

The above, as well as other advantages of the present disclosure, will become readily apparent to those skilled in the art from the following detailed description, particularly when considered in the light of the drawings described hereafter.

Figure 3:
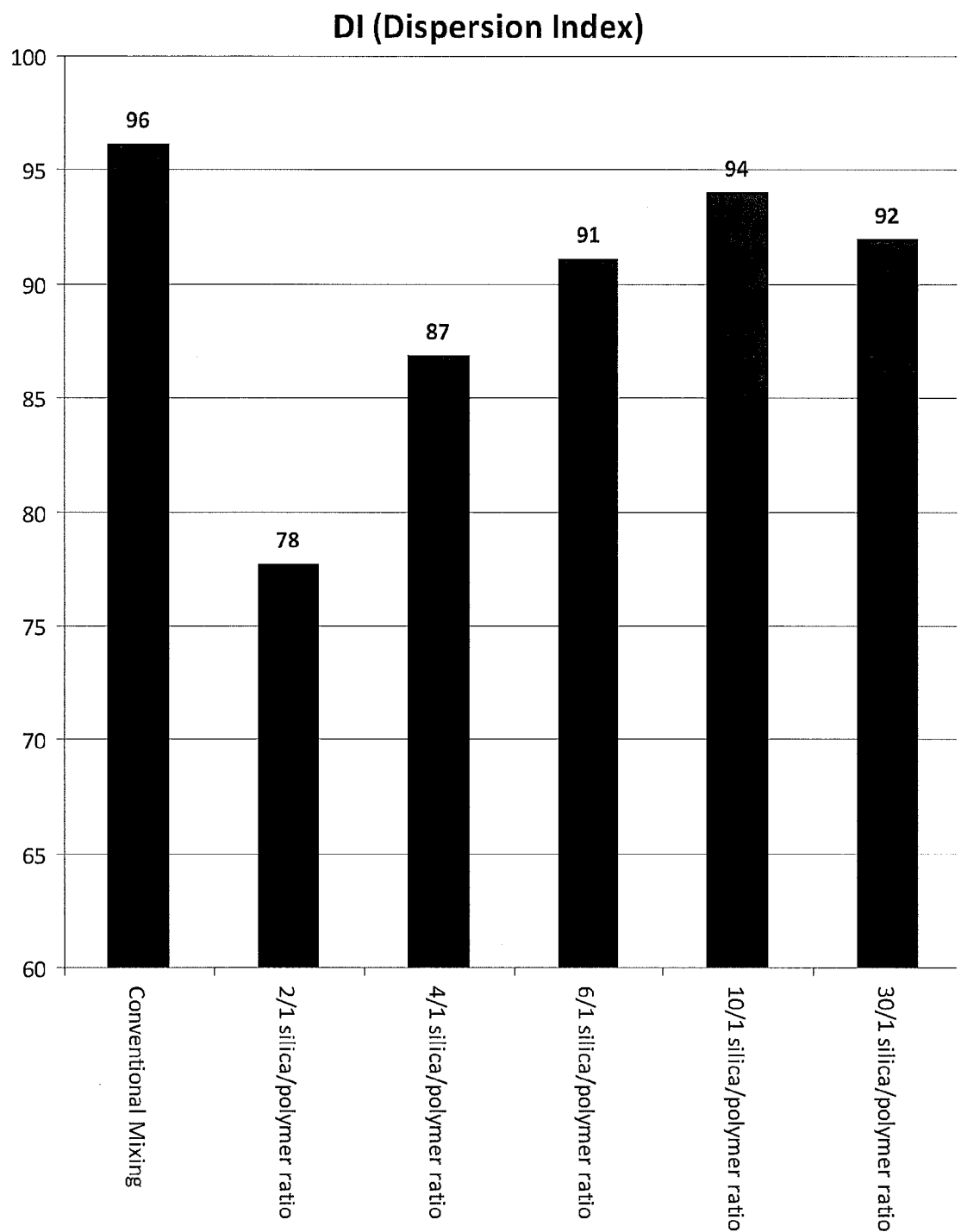
Figure 4:
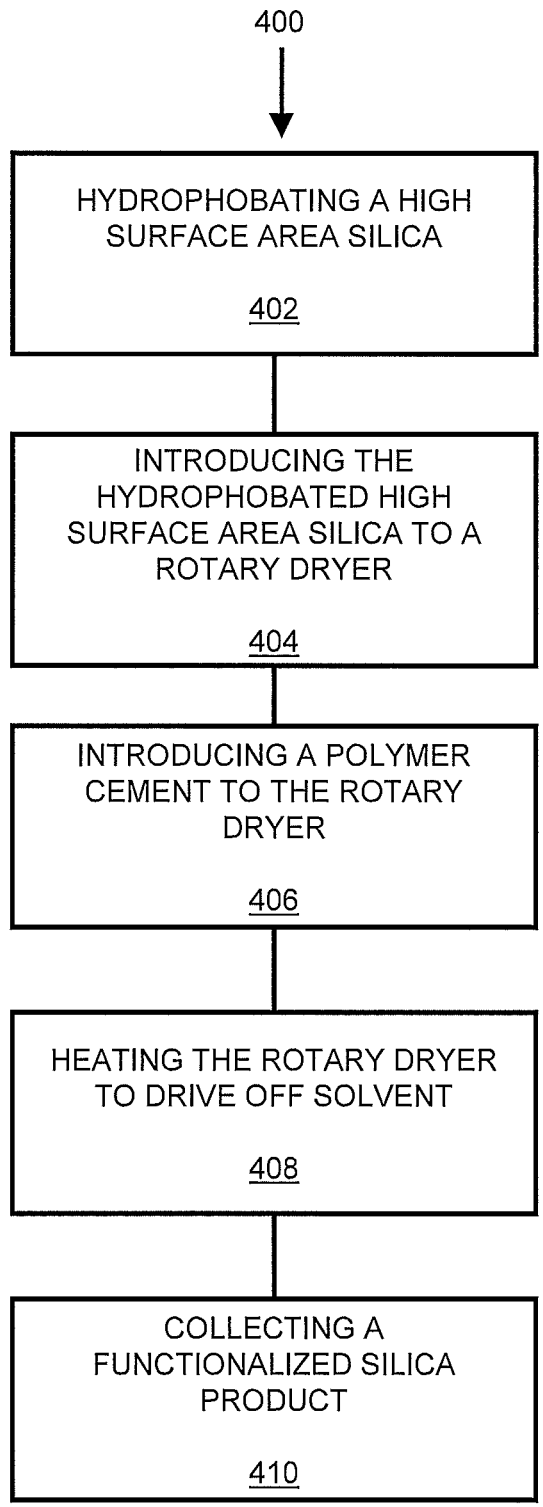

FIG. 3 is a graph illustrating dispersion index test results associated with rubber formulations having the functionalized silica product of the present disclosure, the functionalized silica product provided at a variety of silica/polymer ratios; and FIG. 4 is a flow chart illustrating a method for manufacturing a functionalized silica product according to another embodiment of the present disclosure;

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical unless otherwise disclosed.

The present disclosure includes a method and system for manufacturing a functionalized silica product, as well as rubber products including the functionalized silica product. The functionalized silica product includes a filler composition having silica, a silane coupling agent, and an amount of a polymer that will allow for rapid mixing of the filler into various elastomers. The functionalized silica product is in the form of particles of a hydrophobated silica having a coating of a polymer, which particles may be loosely agglomerated into a friable crumb or powdered material due to a sufficiently high ratio of silica to polymer, or can be in a conventional bale form. Where the particles are in the form of the friable crumb or powdered material, the silica behaves as a partitioning agent and militates against an agglomeration of the friable crumb or powdered material into a mass, upon reaching a critical loading of silica relative to the polymer.

The polymer of the functionalized silica product may be either an emulsion polymer or a solution polymer. In the case of emulsion polymer, the emulsion polymer provides an advantage, in that the process of making the filler/polymer/silane composite is quite simple. Emulsion polymerization is a type of radical polymerization that usually starts with an emulsion incorporating water, monomer, and surfactant. Emulsion polymerization is used to manufacture several commercially important polymers. Many of these polymers are used as solid materials and must be isolated from the aqueous dispersion after polymerization. A stable dispersion (emulsion) of polymer microparticles in an aqueous medium, resulting from emulsion polymerization, is often called a latex.

In the case of solution polymer, and as one nonlimiting example depicted in FIG. 4, the functionalized silica product may be formed by a method 400 that involves a step 404 of introducing the hydrophobated high surface area silica in a rotary dryer. The high surface area silica may be hydrophobated beforehand, for example, in a hydrophobtaining step 402, or hydrophobated in situ in the rotary dryer. The method 400 also includes a step 406 of introducing a polymer cement, i.e., a solution having an organic solvent in which a solution polymer is at least partially dissolved (and in particular embodiments fully dissolved), to the rotary dryer having the hydrophobated high surface area silica. The polymer cement may be sprayed into the rotary dryer, for example. The solvent of the polymer cement is then driven off though a heating 408 of the rotary dryer, resulting in the formation of the coating of the solution polymer on the particles of the hydrophobated high surface area silica for subsequent collection 410. Suitable heating temperatures may be selected by a skilled artisan, as desired. It should be understood that additional materials such as partitioning agents may also be mixed with the silica in the rotary dryer, where the production of a friable crumb or powder is desired.

Any suitable polymer may be used in the functionalized silica product of the present disclosure, including, but not limited to: natural rubber; polymers made from one or more conjugated dienes having from 4 to 12 carbon atoms, preferably from 4 to 6 carbon atoms such as butadiene or isoprene; polymers made from a conjugated diene having from 4 to 12 carbon atoms with a vinyl substituted aromatic having from 8 to 12 carbon atoms such as styrene, alpha-methyl styrene, vinylpyridine, and the like; polymers and copolymers made from chloroprene (that is polychloroprene); various halogen-containing polymers such as copolymers of vinylidene fluoride and hexafluoropropylene; acrylic rubbers including polymers and copolymers of alkyl acrylates; various nitrile rubbers; and combinations thereof. One of ordinary skill in the art may select other polymers for the functionalized silica product, as desired.

A variety of silica types are suitable for use in functionalized silica product of the present disclosure, including amorphous silica and fumed silica products. In a most particular embodiment, the silica used in the functionalized silica product is high surface area silica. Known types of high surface area silica are described in U.S. Pat. No. 7,628,971 to Stenzel et al., the entire disclosure of which is hereby incorporated herein by reference. A representative example of commercially available silica which conform to the above requirements include Zeosil® Premium 200 MP (220 $m^2$/g BET specific surface area). Other suitable types of high surface area silica may also be used within the scope of the disclosure.

It should be appreciated that high surface area silica, as defined herein, provides advantages when compounded into rubber end products such as tires. For example, the high surface area silica can provide improved abrasion resistance (e.g., tire tread wear), greater modulus and tensile compared to silica fillers with lower surface area, and higher dynamic modulus (e.g., improved tire handling and traction).

Skilled artisans may also use a variety of silane coupling agents with the functionalized silica product. The coupling agent will contain functionality which can react with the silica and the rubber. Representative examples of the silane include (3-mercaptopropyl)triethoxysilane, (3-mercaptopropyl)trimethoxysilane, (3-thiocyanatopropyl)trimethoxy silane, (3-thiocyanatopropyl)triethoxysilane, Bis[3-(triethoxysilyl)propyl]tetrasulfide, Bis[3-(trimethoxysilyl)propyl]tetrasulfide, Bis[3-(triethoxysilyl)propyl]disulfide, Bis [3-(trimethoxysilyl)propyl]disulfide and 3-(triethoxysilyl) propyl octanethioate, and silanes that contain blocked mercaptan groups. It should be appreciated that other types of suitable silane coupling agents may be employed, as desired.

The type of silane used will dictate the way in which it is applied to the silica surface. One method of hydrophobation which works for all silanes is to dissolve the silane in an organic solvent and slurry the silica in the solvent until the reaction is completed. The silica can then be filtered and dried. This method is taught in U.S. Pat. No. 3,768,537 to Hess et al., the entire disclosure of which is hereby incorporated herein by reference. Another method of hydrophobtaining the silica involves spraying the silane directly onto the surface of the silica. A convenient method of hydrophobation involves dissolving the silane in an acidic aqueous solution and then reacting with a slurry of silica at a slightly basic pH as taught in U.S. Pat. No. 8,357,733 to Wallen et al., the entire disclosure of which is hereby incorporated herein by reference. Note that the latter procedure is limited to silanes which will hydrolyze readily and form aqueous solutions, but where applicable this method is advantageous.

Regardless of the method of hydrophobation, the resulting silica silane reaction product can be slurried with latex and coagulated. This is much simpler than using a solution polymer to make a polymer/hydrophobated silica composite, for example, as described in U.S. Pat. No. 6,407,153 to von Hellens, the entire disclosure of which is incorporated herein by reference. In von Hellens, an aqueous suspension of silica has to be mixed with a highly viscous solution of styrene butadiene rubber in a hydrocarbon solvent. In addition to the difficulties in bringing these two incompatible phases together, and ensuring that the silica is evenly mixed into the polymer, one also must be concerned about stripping off the volatile solvent. Thus, it is advantageous to use water based latex polymer rather than solution based polymer in an organic solvent to coat the silane treated silica.

It should be understood that the process of the present disclosure, using a very high silica to polymer ratio, allows for a minimization of the polymer in the final rubber compound formulation. This is important because the highest performance silica-rubber compounds have solution polymers which are superior to emulsion polymers for this application. See G. Heinrich KGK, July 2008 p. 368 "Why Silica Technology needs SSBR in high performance tires". Thus, to optimize the preparation of the functionalized silica and polymer composite, a latex-based process is employed, but to minimize the effect of the emulsion polymer in the composite on overall rubber compound performance, the high silica to polymer ratio is used. This has not heretofore possible with conventional silica masterbatch technology.

As opposed to baleable masterbatch products known in the art, the functionalized silica product of the present disclosure may have a high silica to polymer ratio sufficient to form a friable crumb or a powder. As particular nonlimiting examples, the silica to polymer ratio may be from about 0.3/1 to 100/1, more particularly from about 5/1 to about 25/1, and most particularly about 10/1. However, one of ordinary skill in the art should understand that other ratios of silica to polymer in the functionalized silica product, sufficient to form the friable crumb or powder with the functionalized silica product, but insufficient to form a bale, may also be employed by skilled artisans as desired.

Figure 1:
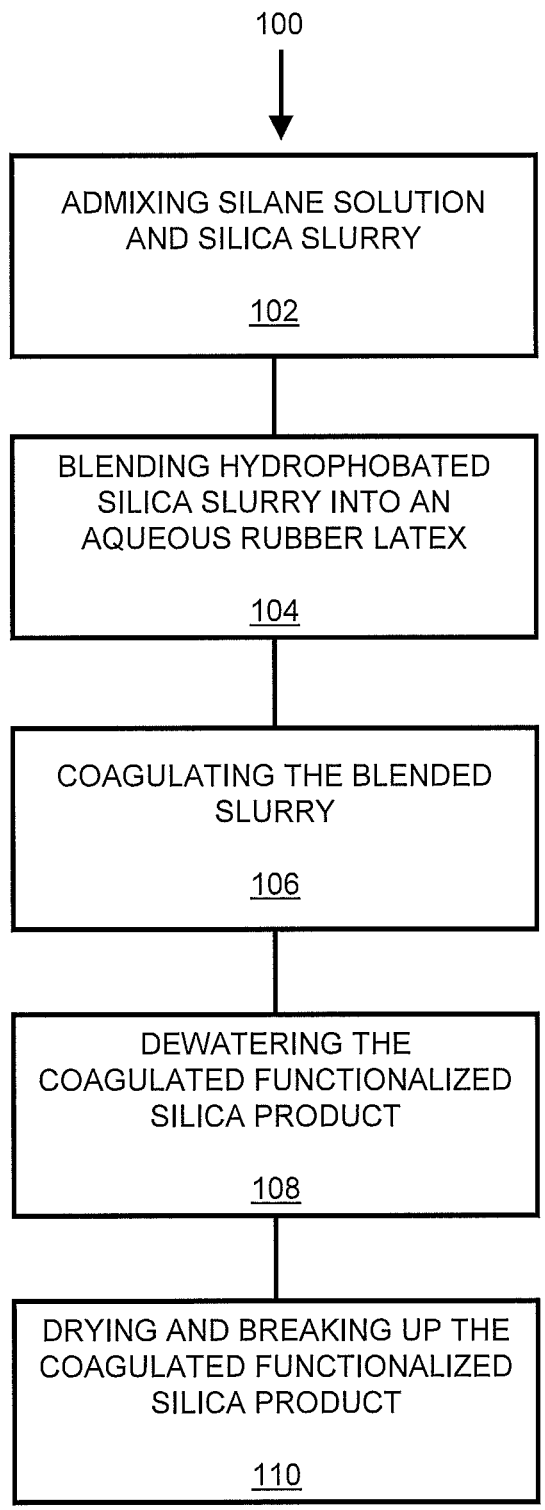
FIG. 1 is a flow chart illustrating a method for manufacturing a functionalized silica product according to the present disclosure.

As shown in FIG. 1, the present disclosure further includes a method 100 for manufacturing the functionalized silica product. In the method 100, an aqueous silane solution is prepared or provided. As a nonlimiting example, an amount of isopropanol (equal parts by weight with a silane) is mixed with acetic acid. Equal parts by weight of the silane such as mercapto silane are then added while stirring continuously. An excess of water (e.g., nine times the amount of isopropanol by weight) is then added slowly in several steps, while letting the solution clear between the additions.

A silica slurry may then be prepared or provided for the method 100. In one nonlimiting example, the silica slurry is prepared by adding water to a precipitated silica wet cake, until the precipitated silica wet cake is diluted to a desired percent solids (e.g., approximately 8% solids). As used herein, the term "wet cake" means a partially dewatered silica product used conventionally in the silica industry. The silica slurry may then be weighed and heated. For example, the silica slurry may be heated to about 160° F. or 71° C. One of ordinary skill in the art may heat the silica slurry to other suitable temperatures, as desired.

In another embodiment, the silica slurry is prepared from dry silica powder or granules. The dry silica power or granules may be processed through a grinder to reduce particle size. In particular embodiments, the particle size is reduced to an average below 3 µm. Water is then added to produce the silica slurry, for example, of approximately 8% solids. The silica slurry is then weighed and heated. For example, the silica slurry may be heated to about 160° F. or 71° C. One of ordinary skill in the art may heat the silica slurry to other suitable temperatures, as desired.

The silica is then hydrophobated in a step 102 by admixing the aqueous silane solution and the silica slurry. The silica slurry and an aqueous silane solution are then mixed for a predetermined period of time. For example, the predetermined period of time may be approximately 5-10 minutes. A skilled artisan may select other predetermined periods of time within the scope of the disclosure.

During the step 102 of admixing the aqueous silane solution and the silica slurry, a pH of the mixture may be adjusted. For example, the pH may be increased to a range from 7.0 to 9.5 by the addition of a basic solution such as a NaOH solution, for example, to cause a condensation of the silane with silanol groups on the silica particles suspended in the silica slurry to form siloxane linkages or bonds, thereby hydrophobtaining the silica. Preferably this range is 7.3 to 8.5 and most preferably to 7.6 to 7.8. The reaction mixture may then be heated to a desired temperature such as 160° F. or 71° C. for approximately 1-3 hours.

The method 100 further includes a step of preparing or providing a rubber latex. For example, a rubber latex of 20% solids content may be weighed, and then heated to a desired temperature (e.g., 140° F. or 60° C.). The rubber latex is then removed from the heat and a pH of the rubber latex is increased to approximately 11.0 using a basic solution, such as a NaOH solution.

Ingredients such as process oils and anti-oxidants may then be vigorously stirred into the rubber latex. Where the process oils and the anti-oxidants are added, the process oils and the anti-oxidants may be preblended. For example, the process oil may be weight up and an amount of anti-oxidant may be added to the process oil. The mixture of the process oil and the antioxidant is then heated to a desired temperature (e.g., 210° F. or 99° C.) to facilitate a dissolving of the anti-oxidant into the process oil.

The silica slurry is then added to the rubber latex/oil blend in a step 104. For example, while stirring the rubber latex vigorously, the process oil/anti-oxidant blend is slowly added. The hydrophobated silica slurry is then added to the blend of the rubber latex and process oil/anti-oxidant. The pH of the blend is adjusted to approximately 9.5, if necessary, in order to militate against coagulation prior to mixing, and to give the rubber latex ample opportunity to absorb onto, or otherwise coat, the surfaces of the suspended silica particles. The blend may be adjusted to other basic pH levels, as desired. The blend is mixed for a predetermined time period, for example, 15 minutes, until the blend is substantially consistent throughout. Other suitable times for blending the hydrophobated silica slurry into the aqueous rubber latex may also be used, as desired.

A coagulant may then be prepared or provided for purposes of coagulating the blend of hydrophobated silica slurry and rubber latex in a step 106. The coagulant may be prepared by weighing $CaCl_2$ into an excess of water. The coagulant mixture is stirred until the $CaCl_2$ is dissolved. Other suitable types of coagulant may also be selected by one of ordinary skill in the art.

Following preparation of the coagulant, the coagulant is added to the blend of hydrophobated silica slurry and rubber latex, and mixed thoroughly in the step 106. The coagulation occurs during the addition and mixing of the coagulant into the blend, to form a coagulated blend. Alternatively, the hydrophobated silica slurry/rubber latex mixture is added to the coagulant solution with stirring.

The coagulated blend is then pumped into a dewatering device such as a filter press for the purposes of dewatering in a step 108. The dewatering device may be a vertical filter press having a porous cloth, similar to a type used in the manufacturing process of precipitated silica, for example. Water intermixed with the coagulated slurry is then squeezed out through the porous cloth leaving the coagulated blend behind. The coagulated blend is then washed while still in the dewatering device to remove any salts formed during the coagulation process. The water is then squeezed out again to leave the coagulated blend with an initial water content of less than approximately 75% water.

After the initial dewatering, the coagulated blend enters a final drying step 110 in which the coagulated functionalized silica product is dried and broken up. In the final drying step, the semi dry coagulated blend is dried in a drying device, for example, in a fluid bed oven, to a final water content of less than 2% water. One of ordinary skill may select suitable temperatures and drying times for the fluid bed oven, as desired. Another example of a drying process is spray drying, which has the advantage of not requiring a granulation step.

Either before or after the final drying step, the coagulated blend is also loosely broken up, if necessary, into a granular consistency using a granulating device. Additional partitioning agents may also be added to the granulated functionalized silica product. As nonlimiting example, suitable partitioning agents may include calcium carbonate, talc, mica, clay, zinc stearate, calcium stearate, additional non-hydrophobated or hydrophobated silica, and the like. Any device suitable for forming one of a friable crumb and a powder from the coagulated blend, and any partitioning agent suitable for subsequent use in rubber products, may be used within the scope of the present disclosure.

Figure 2:
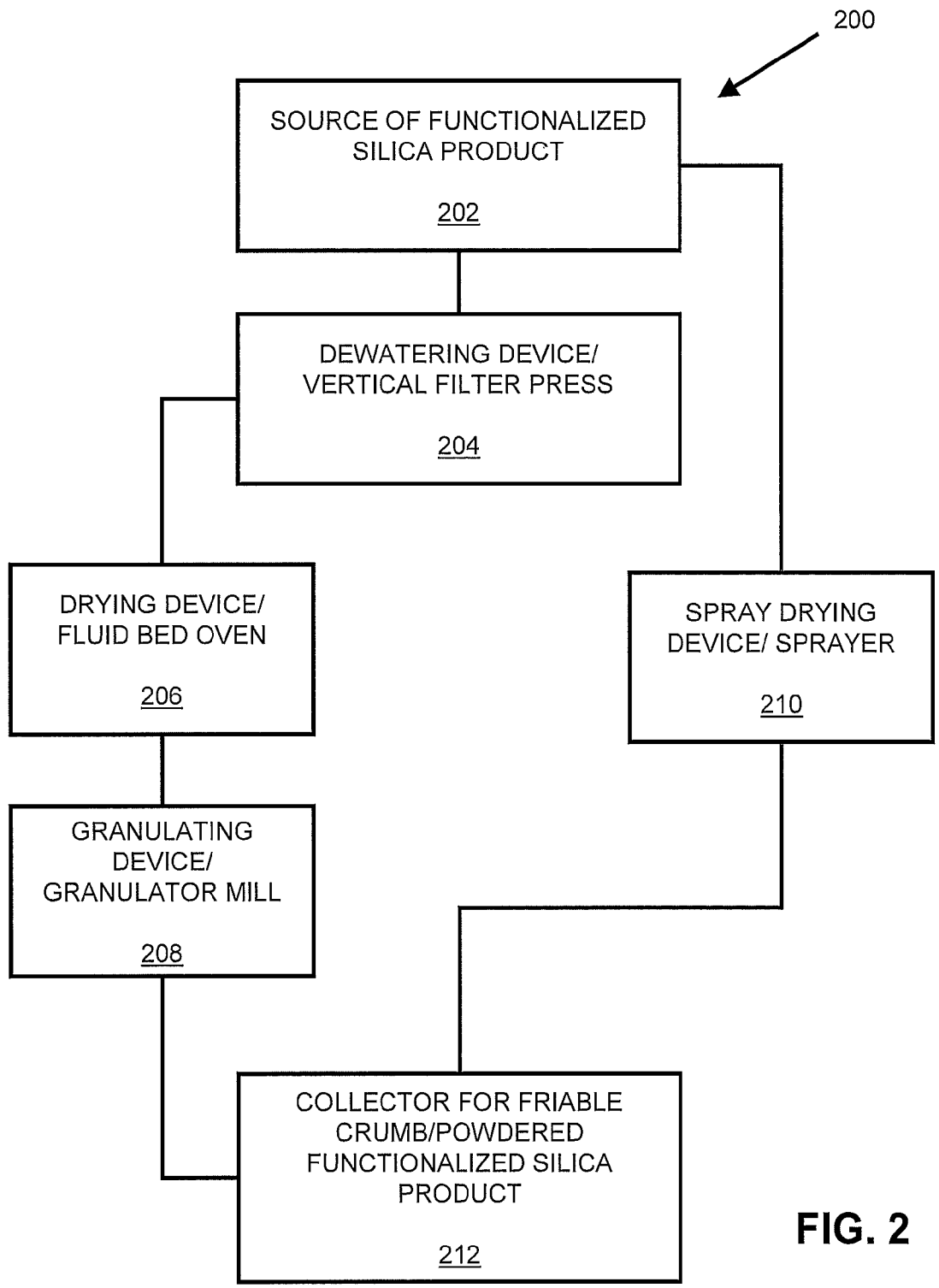
FIG. 2 is a schematic illustrating a system for manufacturing the functionalized silica product according to the present disclosure.

As shown in FIG. 2, the present disclosure further includes a system 200 for manufacturing the functionalized silica product. The system 200 includes a source 202 of the functionalized silica product, for example, as provided according to the method 100 depicted in FIG. 1 and described hereinabove.

The system 200 may include a dewatering device 204 that receives the functionalized silica product produced according to the method 100. In a particular embodiment, the dewatering device is a vertical filter press. As nonlimiting examples, the vertical filter press may be one the vertical filter presses commercially available from Larox Hoesch (http://larox.smartpage.fi/en/hoesch/pdf/Larox_Hoesch.pdf) or Menardi (http://www.menardifilters.com/pdf/liquid_brochure.pdf).

The general operating principles of the vertical filter press, applied relative to the functionalized silica product of the present disclosure, are as follows.

1. Filling and Filtration: In operation, the coagulated blend generated in step 106 is pumped through a feed channel into filter chambers of the vertical filter press simultaneously. During filtration, the solids of the coagulated blend are captured by the filter cloth on both sides of the chamber to form a cake with the filtrate displaced through the cloth. During filtration, the cake thickness increases until the desired solids concentration is reached.

2. Cake Washing through the Slurry Channel: After filtration, the wash water displaces the suspension from the inlet channel and flows into the chamber. In the chamber, the washing medium flows in a gap between the filtered cakes to wash out the mother liquor. Due to the uniform cakes, the cake wash takes place evenly over the entire filtering area.

3. Pre-Squeezing: Air or water presses the membrane into the filter chamber. The membrane reduces the chamber volume and squeezes the filter cakes on each side to form a single cake of the functionalized silica product and to mechanically remove filtrate.

4. Cake Washing through the Corner Channel: The washing medium is introduced into the filtrate channels on the membrane side and penetrates through the cake of the functionalized silica product by pressure. The wash filtrate leaves the chamber through the filtrate channels on the chamber side. The pre-squeezing of the membrane remains on during washing to prevent the formation of cracks and enhance the washing results.

5. Post-Squeezing: The filter cake of the functionalized silica product is further dewatered by squeezing with a membrane at high pressure, which ensures maximum mechanical dewatering. At the same time, this step prepares the cake for blow-drying.

6. Blow-Drying: Compressed air may be introduced through the filtrate channel on the membrane plates and blows through the cake of the functionalized silica product, removing filtrate to achieve low residual moisture. During blow-drying, the cake remains under membrane pressure.

7. Cake Discharge: Once the filtration sequence is completed the filter is opened to allow the cakes of the functionalized silica product to drop out of the filter.

8. Cloth Washing: To ensure consistent filtration, it may be necessary to wash the filter cloths. This washing can be achieved either by flushing the plates from a manifold above or by a high-pressure spray bar that passes between the plates.

The system 200 may further include a drying device 206. The drying device 206 is in communication with the dewatering device 204. For example, the drying device 206 may be a fluid bed oven that receives the cakes of the functionalized silica product from the vertical filter press. Other types of drying devices 206 are also contemplated, and may be used within the scope of the disclosure.

Optionally, where the dried functionalized silica product does not self-separate into the friable crumb or powder of a desired particle size, the system 200 can further include a granulating device 208. The granulating device 208 may be a granulating mill that receives the dried cakes of the functionalized silica product from the fluid bed oven. The granulating device 208 is configured to grind the dried cakes of the functionalized silica product to form the friable crumb or powder to the desired particle size. One of ordinary skill in the art may select a suitable granulating mill and grinding parameters for forming the friable crumb or powder, as desired.

In an alternative embodiment, the system 200 includes a spray drying device 210, such as a high pressure sprayer, for spray drying the functionalized silica product against a surface from which the functionalized silica product may be collected. It should be appreciated that the use of the spray drying device 210 has the advantage of not requiring a separate granulating device 208. A skilled artisan may select a suitable spray drying device 210 including spraying parameters and spraying surfaces on which the functionalized silica product is collected, as desired.

In either the case of the granulating device 208 or the spray drying device 210, the system may further include a collector 212. The collector 212 receives the dried and granulated functionalized silica product for subsequent use. In one example, the collector 212 may include a product collection cyclone which transports the functionalized silica product for storage, for example, to a silo, supersack or small low-melt bags for delivery and the desired end use.

The present disclosure also includes a rubber formulation having a quantity of elastomer, and a quantity the functionalized silica product. The particles of the functionalized silica product may be substantially evenly distributed throughout the elastomer, for example, by a mixing operation prior to an extrusion or molding operation, as nonlimiting examples. It should be understood that the substantially even distribution of the functionalized silica product throughout the elastomer may be facilitated by a thorough mixing operation, and that the ability to perform such mixing operations is possessed by of one of ordinary skill in the art.

The rubber formulation can be compounded by methods known in the rubber compounding art, such as mixing various sulfur-vulcanizable constituent polymers with various commonly used additive materials as, for example, curing aids such as sulfur, activators, retarders and accelerators, processing additives such as oils, resins, for example, tackifying resins, silicas, plasticizers, fillers, pigments, fatty acid, zinc oxide, waxes, antioxidants and antiozonants, peptizing agents, and reinforcing materials such as, for example, carbon black, and the like. Other suitable additives for rubber formulations may also be used, as desired. Depending on the intended use of the rubber formulation, the common additives are selected and commonly used in conventional amounts.

In a particular embodiment, the quantity of elastomer includes a solution polymer such as an SSBR. However, one of ordinary skill in the art may compound the functionalized silica product into other types of rubber formulations, including different types and combinations of types of elastomer, as desired.

The present disclosure also includes an article comprising the rubber formulation. It should be appreciated that the rubber formulation having the functionalized silica product may be extruded, molded, or otherwise formed into a desired shape and cured through the application of at least one of heat and pressure. As a nonlimiting example, the rubber formulation may used in a tire having a component such as a tire tread, sidewall, belt coat, or another component of the tire. Other types of articles including commercial products may also be manufactured using the rubber formulation with the functionalized silica product, within the scope of the disclosure.

EXAMPLES

The functionalized silica product may have a formula as shown in TABLE 1, which makes approximately one (1) kilogram of the functionalized silica product.

TABLE 1

| Material | PHR | Actual Weights (Grams) | (% Solid Content) | Material Weights (Grams) |
| --- | --- | --- | --- | --- |
| Rubber Latex | 100 | 437 | 20.0% | 87 |
| Silica | 1000 | 10925 | 8.0% | 874 |
| Silane | 65 | 56.8 | — | 57 |
| Process Oil | 1.5 | 1.3 | — | 1.3 |
| Anti-oxidant | 0.4 | 0.35 | — | 0.4 |

It should be appreciated that TABLE 1 is an exemplary formulation of the functionalized silica product, shown for purposes of illustrating the invention. Although a 10/1 silica to polymer ratio is shown for the functionalized silica product in TABLE 1, it should be appreciated that the functionalized silica product having different ratios, e.g., 4/1, 6/1, 30/1, 50/1, etc. may likewise be formulated accordingly. Where the silica content of the functionalized silica product is increased, it should be appreciated that at least one of the amounts of silane, process oil, and anti-oxidant may be increased proportionally on a per weight basis.

The silica to polymer ratio is sufficient to form a friable crumb or powder filler material. It should be understood that the particular silica/polymer ratios may also be set based on performance characteristics that are not necessarily tied to the ratio where the composite becomes a friable crumb or powder.

A series of experimental rubber formulations having the functionalized silica product of the present disclosure, with varying ratios of silica to polymer, is shown in TABLE 2 below. It should be understood that all formulations are described relative to 100 parts per hundred rubber or elastomer (PHR), on a per weight basis, with elastomer in the functionalized silica product contributing to the 100 total parts of elastomer in the experimental rubber formulations in which the functionalized silica product was used.

TABLE 2

| Description | Control | 2/1 ratio | 4/1 ratio | 6/1 ratio | 10/1 ratio | 30/1 ratio |
| --- | --- | --- | --- | --- | --- | --- |
| SOLUTION SBR/POLYBUTADIENE | 100.00 | 60.00 | 80.00 | 86.67 | 92.00 | 98.25 |
| SILICA | 80.00 | — | — | — | — | — |
| CARBON BLACK | 12.00 | 12.00 | 12.00 | 12.00 | 12.00 | 12.00 |
| WAX | 2.00 | 2.00 | 2.00 | 2.00 | 2.00 | 2.00 |
| ZINC OXIDE | 2.50 | 2.50 | 2.50 | 2.50 | 2.50 | 2.50 |
| ANTIOXIDANT | 2.50 | 2.34 | 2.42 | 2.45 | 2.47 | 2.49 |
| STEARIC ACID | 1.50 | 1.50 | 1.50 | 1.50 | 1.50 | 1.50 |
| SILANE | 6.40 | — | — | — | — | — |
| OIL | 30.25 | 6.26 | 10.10 | 10.89 | 29.46 | 30.00 |

TABLE 2-continued

| Description | Control | 2/1 ratio | 4/1 ratio | 6/1 ratio | 10/1 ratio | 30/1 ratio |
|---|---|---|---|---|---|---|
| FATTY ACIDS; ZINC SALT | 2.00 | 2.00 | 2.00 | 2.00 | 2.00 | 2.00 |
| FSP 200 phr Silica 60 phr Oil | — | 147.95 | — | — | — | — |
| FSP 400 phr Silica 100 phr Oil | — | — | 123.62 | — | — | — |
| FSP 600 phr Silica 145.85 phr Oil | — | — | — | 116.30 | — | — |
| FSP 1000 phr Silica 10 phr Oil | — | — | — | — | 92.21 | — |
| FSP 3000 phr Silica 30 phr Oil | — | — | — | — | — | 85.39 |
| SULFUR | 2.00 | 2.00 | 2.00 | 2.00 | 2.00 | 2.00 |
| ACCELERATOR | 4.00 | 4.00 | 4.00 | 4.00 | 4.00 | 4.00 |
| Total PHR: | 245.15 | 242.55 | 242.13 | 242.30 | 242.13 | 242.13 |
| Specific Gravity: | 1.196 | 1.200 | 1.200 | 1.199 | 1.204 | 1.196 |

The control rubber formulation was mixed according to a conventional three pass mixing cycle, which includes a step with temperatures controlled in order to permit an in situ silanization of the silica filler introduced at the mixer. The experimental rubber formulations, having the functionalized silica product at silica to polymer ratios of 2/1, 4/1, 6/1, 10/1, and 30/1, were also mixed according to the conventional three pass mixing cycle, to ensure a similar shear history for all of the rubber formulations.

The control and experimental rubber formulations were then characterized according to a battery of conventional rheometric, physical, and other rubber performance tests. The testing of the control and experimental rubber formulations included dispersion testing, with test results shown in FIG. 3. The dispersion testing was performed using a disperGRADER™ dispersion measurement system, commercially available from Alpha Technologies in Akron, Ohio. The disperGRADER™ dispersion measurement system uses a reflected light microscope for dispersion testing of filler in mixed rubber compounds, by measuring shadows cast by agglomerates present in a freshly cut sample surface. Dispersion test results are provided on a scale of 0-100, with a greater number indicating a superior quality of dispersion.

As illustrated in FIG. 3, it was surprisingly found that a minimal silica loading of about 400 phr (4/1) in the functionalized silica product, being in a friable crumb or powder form, may be necessary to obtain acceptable dispersion in an ultimate rubber formulation using the functionalized silica product. Other performance characteristics may also be used by a skilled artisan in selecting the particular silica/polymer ratio for the functionalized silica product, as desired.

Advantageously, the functionalized silica product of the present disclosure can be incorporated into a rubber system with excellent dispersion and minimal dust release, because the functionalized silica product includes particles coated with a layer of rubber. Even though the functionalized silica product employs an emulsion rubber (emulsion SBR, for example), the functionalized silica product may be incorporated into an SSBR rubber compound without significantly affecting overall rubber compound performance, due to the very low level of emulsion rubber present in the functionalized silica product.

The functionalized silica product is preferably used with high surface area silicas. It is surprisingly found that the functionalized silica product, having the particles with the thin layer of emulsion polymer, and provided in the form of a friable crumb or powder, facilitates a dispersability of the high surface area silica in rubber formulations. The employment of the functionalized silica product also advantageously permits the incorporation of silica into rubber compounds in a continuous mixing operation.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for manufacturing a functionalized silica product, the method comprising the steps of:
   providing a hydrophobated high surface area silica in a rotary dryer;
   introducing a polymer cement to the rotary dryer, the polymer cement having a solution polymer at least partially dissolved in a solvent, wherein the solution polymer is a solution styrene butadiene rubber; and
   heating the rotary dryer to drive off the solvent, wherein a functionalized silica product is formed with particles of the hydrophobated silica having a coating of the solution polymer, wherein a ratio of the hydrophobated silica to the solution polymer is from about 0.3/1 to about 100/1, wherein the hydrophobated silica includes a high surface area silica having a BET specific surface area greater than about 200 m$^2$/g, and the particles are loosely agglomerated in the form of one of a friable crumb and a powder.

2. The method of claim 1, wherein the solvent is an organic solvent.

3. The method of claim 1, wherein the step of providing the hydrophobated high surface area silica includes mixing the high surface area silica and a hydrophobating agent in the rotary dryer prior to the step of introducing the polymer cement to the rotary dryer.

4. The method of claim 3, wherein the hydrophobating agent is a silane.

5. The functionalized silica product prepared according to the method of claim 1.

6. A rubber formulation, comprising: a quantity of elastomer; and a quantity of the functionalized silica product of claim 5, the particles substantially evenly distributed throughout the elastomer.

7. An article comprising the rubber formulation of claim 6.

8. A tire comprising a component with the rubber formulation of claim 6.

* * * * *